June 3, 1958  G. W. GRAY ET AL  2,837,639
PULSE AMPLITUDE ANALYZERS
Filed July 29, 1953
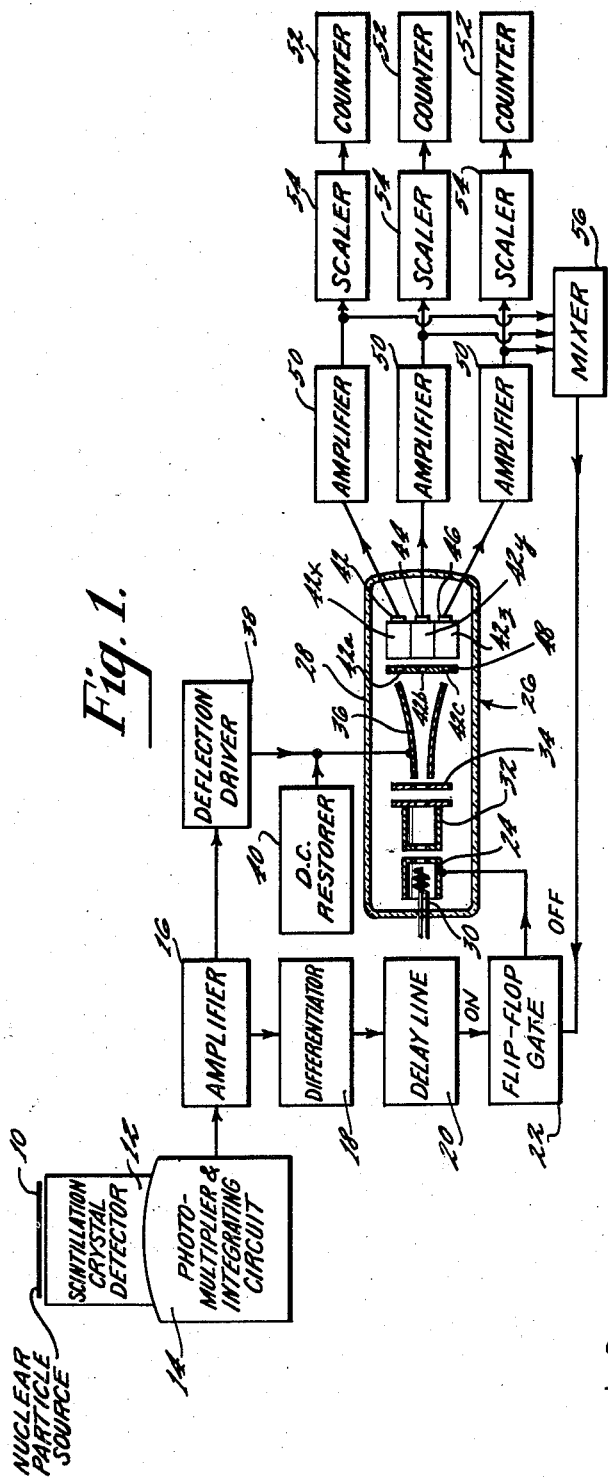
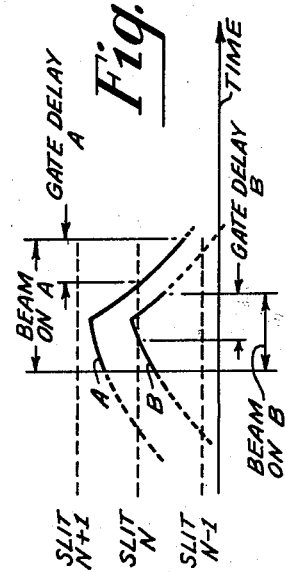
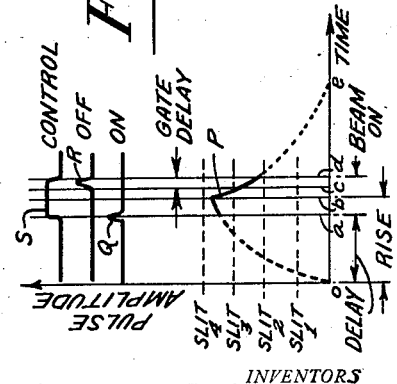
INVENTORS
George W. Gray &
Arthur S. Jensen
BY Morris D. Rahain
ATTORNEY

United States Patent Office 2,837,639
Patented June 3, 1958

2,837,639

PULSE AMPLITUDE ANALYZERS

George William Gray, Lambertville, and Arthur Seigfried Jensen, Princeton, N. J., assignors, by mesne assignments, to the United States of America as represented by the United States Atomic Energy Commission Application July 29, 1953, Serial No. 370,965

9 Claims. (Cl. 250—27)

This invention relates generally to pulse amplitude analyzers. More particularly, though not exclusively, this invention relates to apparatus for sorting and counting a series of pulses, such as are provided by a scintillation counter when exposed to products of nuclear disintegration, for the purpose of determining the distribution of these pulses in amplitude.

In several fields of investigation, particularly in that part of nuclear physics wherein beta ray and gamma ray spectra are of importance, it is necessary to analyze the amplitude distribution of a long series of pulses. In nuclear work, these pulses may be derived from the output of a photomultiplier as a result of scintillations caused by the energetic nuclear particles incident upon a fluorescent crystal such as anthracene, sodium iodide, and the like. Each nuclear particle gives rise to a train of pulses; each pulse being a result of one atomic reorientation in the crystal. Since the nuclear scientist is interested in the energy of the nuclear particle, and since this energy is proportional to the number of such reorientations, the series of pulses caused by one incident particle must be integrated into a single pulse. The pulse amplitude analyzer, in accordance with the present invention, receives only this one single pulse per incident nuclear particle.

It has been proposed to build pulse amplitude analyzers of the type wherein each pulse to be measured is applied to the control grid of an electron gun of a cathode ray tube which is normally cut off, in such a manner as to turn on the beam a fixed amount and for a fixed period of time. The pulse to be measured is also applied to a pair of deflection plates in order deflect the resultant electron beam an amount proportional to the amplitude of the pulse; and a series of targets, or collectors, are positioned within the cathode ray tube to receive the beam current. If the targets, or collectors, are closely spaced relative to each other, the possibility exists wherein an electron beam will strike two targets simultaneously, thereby causing both individual counters connected to each of the targets, respectively, to record the same pulse. If the targets are spaced widely apart, in order to prevent the electron beam from impinging upon two targets simultaneously, there may be instances when the electron beam is directed between the targets and no beam current will flow in any target circuit. In accordance with the present invention, the combination of a slitted mask in the tube and the associated external circuits is used to reduce the region of doubt as to the exact amplitude of the pulse being measured.

In some of the prior art pulse analyzers, it has been necessary to widen the pulses to be measured in order to provide time for measuring them. This procedure reduces the possible counting rate.

Also in some prior art analyzers, the measurement of pulse amplitude is made during the brief time interval while the pulse amplitude is near its peak voltage value. This rapid measurement requires circuits of wide bandwidth in the critical portion of the analyzer wherein high accuracy is desired. This poses serious problems in electronic circuit design, construction and adjustment.

One of the major problems in the design of an analyzer is the determination of the instants of time between which the pulse is near its peak voltage value. In most of the prior art analyzers these instants of time are precalculated from the time constant of the integration circuit and the analyzer is rendered operative during that preset time interval. However, the pulse amplitude is not constant but, in fact, does change during that interval of time with the result that often the pulse activates two of the analyzer amplitude channels simultaneously and causes an error in the sorting and counting.

It is, therefore, a principal object of the present invention to provide an improved pulse amplitude analyzer having features which will overcome the above-mentioned difficulties and disadvantages.

It is another object of the present invention to provide an improved pulse amplitude analyzer wherein an electron beam is made to pass through a slitted mask in order to prevent the electron beam from impinging upon more than one target.

Still another object of the present invention is to provide an improved pulse amplitude analyzer which is adapted to utilize pulses as they come from the integrating circuits and preamplifier following the photomultiplier, thereby obviating the necessity of excessive bandwidth in the circuits wherein an accurate measurement of pulse amplitude is made.

A further object of the present invention is to provide an improved pulse amplitude analyzer adapted to count pulses at a faster rate than is possible with pulse analyzers which require pulses of extended width.

Still a further object of this invention is to provide an improved pulse amplitude analyzer wherein the "on-time" of an electron beam is not prefixed, but is determined by the electron beam crossing a slit in a mask.

According to the invention, these and other objects and advantages are attained in improved apparatus for sorting pulses of voltage of different amplitudes into separate channels, whereby each channel will receive pulses of substantially the same amplitude, and for counting the pulses in each of the channels. Each of the pulses to be sorted and counted is integrated in order to fix its width and rise time to predetermined values. Each pulse is applied to a control circuit where it is differentiated and delayed for a fixed time, in correspondence to the time constant of the integrator, until the pulse to be measured has almost reached its peak value. The differentiated and delayed pulse in the control circuit is then applied through a flip-flop gate circuit, to the control grid of the electron gun of a cathode ray tube, in order to turn on its beam. The pulse to be measured is also applied to a pair of deflection plates in order to deflect the resultant electron beam an amount proportional to the amplitude of the pulse to be measured. Before the electron beam can impinge upon one of a plurality of targets within the cathode ray tube, it must pass through one of a plurality of slits in a mask in front of the targets. As soon as the electron beam passes through any one of the slits, current will flow in the target circuit directly behind the slit and actuate a counter. A portion of the current flowing in the target circuit is fed back to the flip-flop gate circuit, which, in turn, is connected to the control grid of the cathode ray tube, in order to turn off the electron beam. Since circuit constants are chosen whereby the electron beam of the cathode ray tube is turned on when the pulse to be measured has substantially reached its peak voltage value, and since the electron beam is turned off by a feedback circuit when the electron beam passes through a slit determined by the amplitude of the pulse to be measured, it is obvious that the electron beam will impinge upon one target only, thereby reducing the region of doubt as to the amplitude of the pulse being measured. Furthermore, though the control circuit, which differentiates and delays the pulse to turn on the electron beam, and the feedback circuit, which turns off the electron beam, both must be of wide bandwidth, the operation of these circuits is on-off, go-no go, wherein the limitations of bandwidth are not critical, and especially do not effect the accuracy of the pulse amplitude measurement The novel features of the invention, as well as the invention itself, both as to its organization and method of operation, will be understood in detail from the following description when considered in connection with the accompanying drawing, in which similar elements have similar reference numerals, and in which:

Fig. 1 is a diagram, partly in block form and partly schematic, of a pulse amplitude analyzer in accordance with the present invention, and Figs. 2 and 3 are graphs used to explain the operation of the pulse analyzer of Fig. 1.

Referring now to Fig. 1, there is shown a pulse amplitude analyzer, in accordance with the present invention, wherein the pulses derived from a nuclear particle source 10 are to be analyzed. The circuits shown in block diagram form are of conventional types, well known in the art, and, therefore, their details of construction and operation are omitted, for the sake of simplicity. Energy resulting from the nuclear disintegration of the nuclear particle source 10 is detected by a scintillation crystal detector 12 wherein a crystal of anthracene, sodium iodide, or the like, is caused to scintillate, in a manner well known in the art. These scintillations are applied to a photomultiplier and integrating circuit 14. In this manner, the energy of a single nuclear particle, as for example, a beta particle, is detected and integrated into a single pulse. The pulse amplitude analyzer, in accordance with the present invention, receives only one pulse per incident nuclear particle. The shape of this pulse is determined largely by the constants of the integrating circuit 14. The rise time and width of the pulse may be deduced from the constants of the integrating circuit 14 and may be considered a known quantity.

Each integrated pulse is applied to an amplifier 16, and thence to a differentiator circuit 18, where the pulse is differentiated. The differentiated pulse is then fed through a delay line 20, where it is delayed for a period of time which is slightly less than the time necessary for the pulse to be measured to reach its peak voltage value. The differentiated and delayed pulse is then applied to the first of the two inputs of a flip-flop gate circuit 22, which is essentially a bistable multivibrator of conventional type. The output of the flip-flop gate circuit 22 is connected to a control grid 24 of a cathode ray tube 26, of special construction, sometimes referred to as a quantizing tube. The flip-flop gate circuit 22 functions as a single-pole double-throw switching means to turn on or off the electron beam of the quantizing tube.

The quantizing tube 26 comprises an evacuated envelope 28 having an electron gun comprising a cathode 30, the control grid 24, a first anode 32, a second anode 34, and a pair of deflection plates 36. This portion of the tube 26 is of conventional structure and is well known in the art. A source of operating voltages (not shown) is connected to the cathode 30, the control grid 24, the first anode 32, and second anode 34, in the manner well known in the art.

An amplified, integrated pulse from the amplifier 16 is also applied to a deflection driver circuit 38, and thence to the deflection plates 36 for the purpose of deflecting the electron beam, from the electron gun within the tube 26, by an amount proportional to the amplitude of the pulse to be measured. A D. C. restorer circuit 40 is also connected to the deflection plates 36 for the purpose of deflecting the beam to one extreme position, its reference position, when there is no pulse, or a zero amplitude signal is applied to the deflection plates 36.

A plurality of collectors, or targets, aligned transversely to the electron gun, that is, transversely to the path of the electron beam within the tube 26, are positioned to receive electron beam current from the electron gun. While in actual practice, a great number of targets would be used, only three; namely, targets 42, 44 and 46 are shown for the sake of simplicity. A mask 48, impervious to a beam of electrons, is formed with a plurality of openings, or slits 42a, 42b, and 42c. The slitted mask 48 is within the envelope 28 of the tube 26, between the targets and the electron gun thereof. Each of the slits in the mask 48 is aligned with an individual target, respectively, so that an electron beam is adapted to pass through an individual slit and impinge upon one target only. A plurality of electron multipliers 42x, 42y, and 42z are positioned between the mask 48 and the targets 42, 44, and 46. Each of the electron multipliers 42x, 42y, and 42z is aligned with a slit 42a, 42b, and 42c, and a target 42, 44, and 46 respectively. An electron beam passing through one of the slots in the mask 48 will pass through an aligned electron multiplier and impinge upon the target directly behind it. For example, an electron beam deflected so that it will pass through the slit 42a, and the electron multiplier 42x, will impinge upon the target 42. These electron multipliers act in a manner like a preamplifier and may be replaced by an ideal preamplifier of the circuit type well-known in the art.

Each of the targets of the tube 26 is connected to an individual amplifier 50, which, in turn, is connected to its corresponding counter 52 through a scaler circuit 54. Each of the scaler circuits 54 is an "on-off, go-no go" device, well known in the computer art. An individual slit in the mask 48, the target and electron multiplier aligned therewith, the amplifier connected to the target, the scaler, and the counter represent a single channel.

A feedback loop is provided for the purposes hereinafter appearing. To this end, the output of each amplifier 50 is also connected to a mixer circuit 56, which may comprise a series of diodes (not shown). The output of the mixer circuit is connected to a second of the two inputs of the flip-flop gate circuit 22. Since the flip-flop gate circuit 22 has two stable positions of operation, it comprises means (not shown) in the second stable position to bias the grid 24 of the tube 26 to cut-off; and in its first stable position it comprises means (not shown) to remove the cut-off bias from the grid 24, whereby the electron beam of the tube 26 is turned on.

The operation of the pulse amplitude analyzer, in accordance with the present invention, will now be described. A series of integrated pulses of various amplitudes is derived from a source such as the output of the photomultiplier and integrating crcuit 14, as a result of the scintillations caused by the energetic nuclear particles incident upon the scintillation crystal detector 12. Each pulse to be measured must have a known pulse rise time and a known rate of fall. These characteristics are determined by the values of the components of the integrating circuit 14. These components may be variable so that different values may be chosen, when desired, thereby increasing the flexibility of use of the apparatus. Each integrated pulse is then fed to an amplifier 16 where it is amplified a fixed amount.

A typical integrated pulse P is shown in Fig. 2. The amplified pulse is applied to the deflection plates 36 of the tube 26 through the deflection driver circuit 38. The amplified pulse is also applied to a control circuit wherein it is differentiated by the differentiator circuit 18, and then applied to the first of the two inputs of the flip-flop gate circuit 22, after it has been delayed a fixed period of time by the delay line 20. The differentiated and delayed pulse Q is shown in Fig. 2. As a result of the application of the pulse Q to first of the two inputs of the flip-flop gate circuit 22, the grid 24 of the tube 26 enables the electron gun of the tube 26, whereby the electron beam is turned "on" within the tube 26. The enabling of the electron gun of the tube 26 is represented by the pulse S in Fig. 2. The electron beam within the tube 26 is then deflected an amount proportional to the voltage pulse P which has been applied to the plates 36. Since the tube 26 has been turned on just before the peak voltage of the pulse P has been reached, that is, after a period of time represented by the line o—a in Fig. 2, the electron beam will hit the mask 48. The electron beam will remain on until it crosses a single slit in the mask 48, as for example, when the pulse P, in Fig. 2, crosses the slit 3. Let it be assumed that the slit 3 of Fig. 2 represents the slit 42b in the mask 48 in Fig. 1. The electron beam will then pass through the electron multiplier 42y, and current will flow in the channel including the target 44 and its associated amplifier 50, scaler 54, and counter 52. Thus, the pulse is counted. Means are provided to disable that is, turn off the tube 26 as soon as the pulse P has crossed one slit only. To this end, the amplified pulse at the output of the amplifier 50, associated with the target 44, is fed back to the second input of the flip-flop gate circuit 22, through the mixer 56. This latter pulse will cause the flip-flop gate circuit 22 to assume the other of its two stable conditions, whereby the grid 24 of the tube 26 is biased to cut-off. This latter pulse R is shown in Fig. 2.

Thus, it will be understood that each integrated pulse to be measured will have a known rise time o—b, as shown in Fig. 2, and a known fall time b—e, determined from the constants of the integrating circuit 14. The differentiated pulse P is delayed until the peak of the pulse P is substantially reached. This delay time is represented by the line o—a in Fig. 2. The differentiated and delayed pulse Q triggers the flip-flop gate circuit 22, whereby the cut-off bias on the grid 24 is removed, thereby turning on the beam in the tube 26. The electron beam of the tube 26 will remain "on" for the period of time represented by the line a—d, and the pulse S, in Fig. 2. The electron beam current, represented by the pulse S, will be turned off by the pulse R after a short delay time, as represented by the line c—d in Fig. 2. This last mentioned delay time is determined by the constants of the amplifier 50, the mixer 56, and the flip-flop gate circuit 22. It is to be noted that, contrary to prior art systems, the length of time the electron gun is rendered operative is not the same for every pulse being sorted and counted, but varies in accordance with the time necessary for the electron beam to reach a slit in the mask 48. In other words, the length of time the electron beam is rendered operative, as represented by the pulse S in Fig. 2, is equal to the sum of the pulse rise time, the time of pulse fall through the first slit interval, and the time of the feedback operation, minus the delay time. It is the feedback loop of the present invention that makes possible the use of pulses as they exist without limiting the system performance because the duration of the "on" time of the electron beam is variable rather than fixed. This feature also obviates the necessity of wide band circuits of particularly careful design in the deflection amplifier circuits.

Referring now to Fig. 3, there are shown two possible modes of operation of the pulse analyzer, in accordance with the present invention. The first case is represented by a pulse A whose peak amplitude lies between two slits; namely, slit N and slit N+1. In this case, the electron beam of the tube 26 is turned on by the differentiated pulse of the pulse A, and is turned off after a gate delay time following the crossing of the slit N by the deflected beam.

The pulse B of Fig. 3 is a pulse whose amplitude just carries the electron beam above the slit N while the electron beam is on, the beam having been turned on prior to the beam's being deflected to slit N. In this case, the electron beam generates an output pulse as it traverses the slit in the upward direction. However, it will be noted that in either case the beam is turned off before a second slit is traversed. In the case of the pulse B, the fact that the beam traverses the slit N twice, once in each direction, is of no consequence since the two crossings occur very close together and there is no need for the output amplifier to be such a great bandwidth as to resolve them. Unresolved, the two pulses, generated by the pulse B in crossing the slit N twice, coalesce to form one large pulse. Since the scaler is an on-off, go-no go device, the output amplitude does not matter. Therefore, in the case of the pulse B, the counter associated with the slit N will register the pulse B once, and the first of the two output pulses, resulting from the double crossing of the slit N by the pulse B, will serve to bias the electron beam to cut off.

Thus, there has been shown and described a pulse amplitude analyzer, in accordance with the objects of the present invention, wherein pulses of different amplitude are sorted into separate channels, and each channel counts pulses of substantially the same amplitude. The pulse amplitude analyzer employs a slitted mask in order to insure that the electron beam impinges upon one target only. A feedback loop is also employed to render the electron gun of the quantitizing cathode ray tube inoperative after the electron beam passes through only one of the slits in the mask. The particular slit through which the electron beam passes is determined by the amplitude of the particular pulse being measured. While the rise time and width of each pulse to be analyzed are fixed by an integrating circuit, the duration of the "on-time" of the electron beam is a variable quantity, dependent upon the amplitude of the pulse, and its relationship to the slits in the mask. This feature makes it possible for the pulse amplitude analyzer to employ circuits of relatively narrower bandwidths, and to count pulses at a relatively fast rate.

What is claimed is:

1. A pulse amplitude analyzer for sorting and counting pulses of voltage comprising means to integrate each of said pulses, means to differentiate each of said integrated pulses, means to delay each of said differentiated pulses for a period equal to substantially the rise time of each of said integrated pulses, a cathode ray tube having an electron gun disposed at one end thereof for producing an electron beam, a plurality of targets disposed at the other end of said tube, a mask formed with a plurality of slits therein disposed between said gun and said targets within said tube, each of said slits being aligned with a path of said electron beam to each of said targets respectively, means to apply operating voltages to said electron gun, switching means responsive to each of said delayed differentiated pulses to render said electron gun operative to project said electron beam therefrom, means to deflect said electron beam an amount proportional to the amplitude of each of said pulses, whereby said beam passes through one of said slits and impinges on the target aligned therewith, feedback means connected between said targets and said switching means to render said electron gun inoperative after said beam passes through one of said slits, and means for indicating the particular target which intercepts said deflected beam.

2. A pulse amplitude analyzer for sorting and counting pulses of voltage of substantially the same time duration comprising means to differentiate each of said pulses, means to delay each of said differentiated pulses for a period equal to substantially the rise time of each of said pulses, a cathode ray tube having an electron gun disposed at one end thereof for producing an electron beam, a plurality of targets disposed at the other end of said tube, a mask formed with a plurality of slits therein disposed between said gun and said targets within said tube, each of said slits being aligned with a path of said electron beam to each of said targets respectively, means to apply operating voltages to said electron gun, switching means responsive to each of said delayed differentiated pulses to render said electron gun operative to project said electron beam therefrom, means to deflect said electron beam an amount proportional to the amplitude of each of said pulses, whereby said beam passes through one of said slits and impinges on the target aligned therewith, feedback means connected between said targets and said switching means to render said electron gun inoperative after said beam passes through one of said slits, and means for indicating the particular target which intercepts said deflected beam.

3. A pulse amplitude analyzer for sorting and counting pulses of voltage of substantially the same time duration comprising means to differentiate each of said pulses, means to delay each of said differentiated pulses for a period equal to substantially the rise time of each of said pulses, a cathode ray tube having an electron gun disposed at one end thereof for producing an electron beam, a plurality of targets disposed at the other end of said tube, a mask formed with a plurality of slits therein disposed between said gun and said targets within said tube, each of said slits being aligned with a path of said electron beam to each of said targets respectively, means to apply operating voltages to said electron gun, switching means responsive to each of said delayed differentiated pulses to render said electron gun operative to project said electron beam therefrom, means to deflect said electron beam an amount proportional to the amplitude of each of said pulses, whereby said beam passes through a predetermined one of said slits and impinges on the target aligned therewith, feedback means connected between said targets and said switching means to render said electron gun inoperative after said beam passes through one of said slits, and means for indicating the particular target which intercepts said deflected beam, said switching means comprising a bistable multivibrator having a first and a second input, and an output, said first input being connected to said delay means, said second input being connected to said feedback means, and said output being connected to said electron gun.

4. A pulse amplitude analyzer for sorting and counting pulses of voltage of substantially the same time duration comprising means to differentiate each of said pulses, means to delay each of said differentiated pulses for a period equal to substantially the rise time of each of said pulses, a cathode ray tube having an electron gun disposed at one end thereof for producing an electron beam, a plurality of targets disposed at the other end of said tube, means to apply operating voltages to said electron gun, switching means responsive to each of said delayed differentiated pulses to render said electron gun operative to project said electron beam therefrom, means to deflect said electron beam an amount proportional to each of said pulses, whereby said beam impinges upon a target, feedback means connected between said targets and said switching means to render said electron gun inoperative after said beam impinges upon only one target, and means for indicating the particular target which intercepts said deflected beam.

5. Apparatus for sorting voltage pulses of different amplitudes and of substantially the same time duration into separate channels, whereby each channel receives the voltage pulses of substantially the same amplitude, and for counting the voltage pulses received by each channel; said apparatus comprising means to differentiate each of said pulses, means to delay each of said differentiated pulses for a time equal to substantially said rise time of each of said pulses, an evacuated envelope, an electron gun including a control grid, and a pair of deflection plates axially aligned within said envelope for producing an electron beam, means for supplying operating voltages to said electron gun, a plurality of linearly aligned targets, within said envelope, and disposed in a row in transverse relationship to the axis of said electron gun, a mask positioned between said electron gun and said targets, said mask being substantially parallel to said row of targets and being formed with a plurality of slits each of which is in alignment with a path of said electron beam from said electron gun to one of said targets respectively, switching means connected between said delay means and said grid and responsive to each of said differentiated pulses to render said electron gun operative, means to apply each of said pulses to said deflection plates to deflect said electron beam an amount proportional to the amplitude of each pulse to be sorted and counted, feedback means connected between each target and said switching means to render said electron gun inoperative after said electron beam has passed through one of said slits and impinged on the target aligned with said one of said slits, and means connected to each of said targets to count each of said pulses as a function of the amplitude of their peak voltages.

6. Apparatus for sorting voltage pulses of different amplitudes into separate channels, whereby each channel receives the voltage pulses of substantially the same amplitude, and for counting the voltage pulses received by each channel; said apparatus comprising integrating means to integrate each of said pulses, whereby to fix the width and rise time of each of said pulses to predetermined values, means to differentiate each of said integrated pulses, means to delay each of said differentiated pulses for a time equal to substantially said rise time of each of said integrated pulses, an evacuated envelope, an electron gun including a control grid, and a pair of deflection plates axially aligned within said envelope for producing an electron beam, means for supplying operating voltages to said electron gun, a plurality of linearly aligned targets, within said envelope, and disposed in a row in transverse relationship to the axis of said electron gun, a mask positioned between said electron gun and said targets, said mask being substantially parallel to said row of targets and being formed with a plurality of slits each of which is in alignment with a path of said electron beam from said electron gun to one of said targets respectively, switching means connected between said delay means and said grid and responsive to each of said differentiated pulses to render said electron gun operative, means connected between said integrating means and said deflection plates to deflect said electron beam an amount proportional to the amplitude of each pulse to be sorted and counted, feedback means connected between each target and said switching means to render said electron gun inoperative after said electron beam has passed through one of said slits and impinged on the target aligned with said one of said slits, and means connected to each of said targets to count each of said pulses as a function of the amplitude of their peak voltages.

7. Apparatus for sorting voltage pulses of different amplitudes and of substantially the same time duration into separate channels, whereby each channel receives the voltage pulses of substantially the same amplitude, and for counting the voltage pulses received by each channel; said apparatus comprising means to differentiate each of said pulses, means to delay each of said differentiated pulses for a time equal to substantially said rise time of each of said pulses, an evacuated envelope, an electron gun including a control grid, and a pair of deflection plates axially aligned within said envelope for producing an electron beam, means for supplying operating voltages to said electron gun, a plurality of linearly aligned targets, within said envelope, and disposed in a row in transverse relationship to the axis of said electron gun, switching means connected between said delay means and said grid and responsive to each of said differentiated pulses to render said electron gun operative, means to apply each of said pulses to said deflection plates to deflect said electron beam an amount proportional to the amplitude of each pulse to be sorted and counted, feedback means connected between each target and said switching means to render said electron gun inoperative after said electron beam has impinged on only one of said targets, and means connected to each of said targets to count each of said pulses as a function of the amplitude of their peak voltages.

8. In a pulse amplitude analyzer of the type wherein the electron gun of a cathode ray tube is rendered operative by substantially the peak voltage of the pulse to be sorted and counted, and wherein the electron beam from the electron gun is deflected an amount proportional to the amplitude of said pulse, whereby said electron beam impinges upon one of a plurality of targets within said tube; a mask within said tube between said electron gun and said targets, said mask being formed with a plurality of slits each of which is aligned with a path of said electron beam to each of said targets respectively, and feedback means connected between each of said targets and said electron gun to render said gun inoperative when said beam passes through a single slit and impinges on the target aligned therewith.

9. In a pulse amplitude analyzer of the type wherein the electron gun of a cathode ray tube is rendered operative by substantially the peak voltage of the pulse to be sorted and counted, and wherein the electron beam from the electron gun is deflected an amount proportional to the amplitude of said pulse, whereby said electron beam impinges upon one of a plurality of targets within said tube; feedback means connected between each of said targets and said electron gun to render said gun inoperative when said beam impinges on only one of said targets.

References Cited in the file of this patent
UNITED STATES PATENTS

| | | |
|---|---|---|
| 2,527,512 | Arditi | Oct. 31, 1950 |
| 2,548,789 | Hergenrother | Apr. 10, 1951 |
| 2,560,166 | Glenn, Jr. | July 10, 1951 |
| 2,589,460 | Tuller | Mar. 18, 1952 |

OTHER REFERENCES

Review of Scientific Instruments, July 1949 (vol. 20, No. 7), pages 495–499, "The Ten Channel Electrostatic Pulse Analyzer" by Dean A. Watkins.